United States Patent
Ballard et al.

(10) Patent No.: US 7,318,245 B2
(45) Date of Patent: Jan. 15, 2008

(54) VEHICLE SURFACE PREPARATION APPARATUS

(75) Inventors: Martha J. Ballard, Lexington, KY (US); Gregory L. Brown, Lexington, KY (US); Jonathan E. Devine, Lexington, KY (US)

(73) Assignee: Toyota Motor Manufacturing North America, Inc., Erlanger, KY (US)

( * ) Notice: Subject to any disclaimer, the term of this patent is extended or adjusted under 35 U.S.C. 154(b) by 303 days.

(21) Appl. No.: 10/378,470

(22) Filed: Mar. 3, 2003

(65) Prior Publication Data

US 2004/0173242 A1    Sep. 9, 2004

(51) Int. Cl.
*B60S 3/06* (2006.01)

(52) U.S. Cl. ............... 15/97.3; 15/DIG. 2; 15/230; 15/53.3

(58) Field of Classification Search ............... 15/3, 15/97.3, 53.1, 53.2, 53.3, 88.1, 88.3, 88.4, 15/DIG. 2, 230, 230.19, 250.18, 250.1, 97.1
See application file for complete search history.

(56) References Cited

U.S. PATENT DOCUMENTS

| | | | |
|---|---|---|---|
| 1,639,876 A * | 8/1927 | Acosta .................. 15/344 |
| 2,170,792 A | 8/1939 | Brooke | |
| 2,215,692 A | 9/1940 | Fleming | |
| 2,949,678 A * | 8/1960 | Anderson .................. 34/105 |
| 3,067,444 A | 12/1962 | Dickson et al. | |
| 3,452,384 A * | 7/1969 | Scinta .................. 15/250.1 |
| 3,626,537 A * | 12/1971 | Wilson .................. 15/53.3 |
| 3,934,297 A * | 1/1976 | Hanna .................. 15/53.3 |
| 4,250,591 A * | 2/1981 | Mello .................. 15/309.2 |
| 4,527,300 A * | 7/1985 | Kunde et al. .................. 15/88.2 |
| 4,547,922 A | 10/1985 | Bivens | |
| 4,689,749 A | 8/1987 | Glogowski | |
| 4,715,079 A * | 12/1987 | Kekewich et al. .......... 15/97.3 |
| 4,716,685 A * | 1/1988 | Kuramoto .................. 451/182 |
| 4,777,687 A | 10/1988 | Cann et al. | |
| 4,827,561 A | 5/1989 | Lamore | |
| 5,405,450 A | 4/1995 | Mifsud | |
| 5,524,329 A | 6/1996 | Schmalzel | |
| 5,613,260 A * | 3/1997 | Belanger et al. .......... 15/53.3 |
| 5,713,092 A | 2/1998 | Belanger et al. | |
| 5,715,558 A * | 2/1998 | Johnson .................. 15/53.3 |
| 6,035,482 A * | 3/2000 | Belanger et al. ......... 15/230.14 |
| 6,068,706 A * | 5/2000 | Justin .................. 134/6 |
| 6,287,388 B1 | 9/2001 | Hahn | |
| 6,434,781 B1 * | 8/2002 | Guerra .................. 15/256.5 |

* cited by examiner

*Primary Examiner*—Laura Guidotti
(74) *Attorney, Agent, or Firm*—Dinsmore & Shohl LLP

(57) ABSTRACT

A passive vehicle surface preparation apparatus includes a mounting assembly and a support arm assembly having support arms pivotally connected to the mounting assembly. The vehicle preparation apparatus further includes a first wiper assembly having a stationary preparation surface for wiping the top surfaces of a vehicle. The vehicle preparation apparatus may also include vertical wiper assemblies for wiping the side panels of the vehicle.

16 Claims, 7 Drawing Sheets

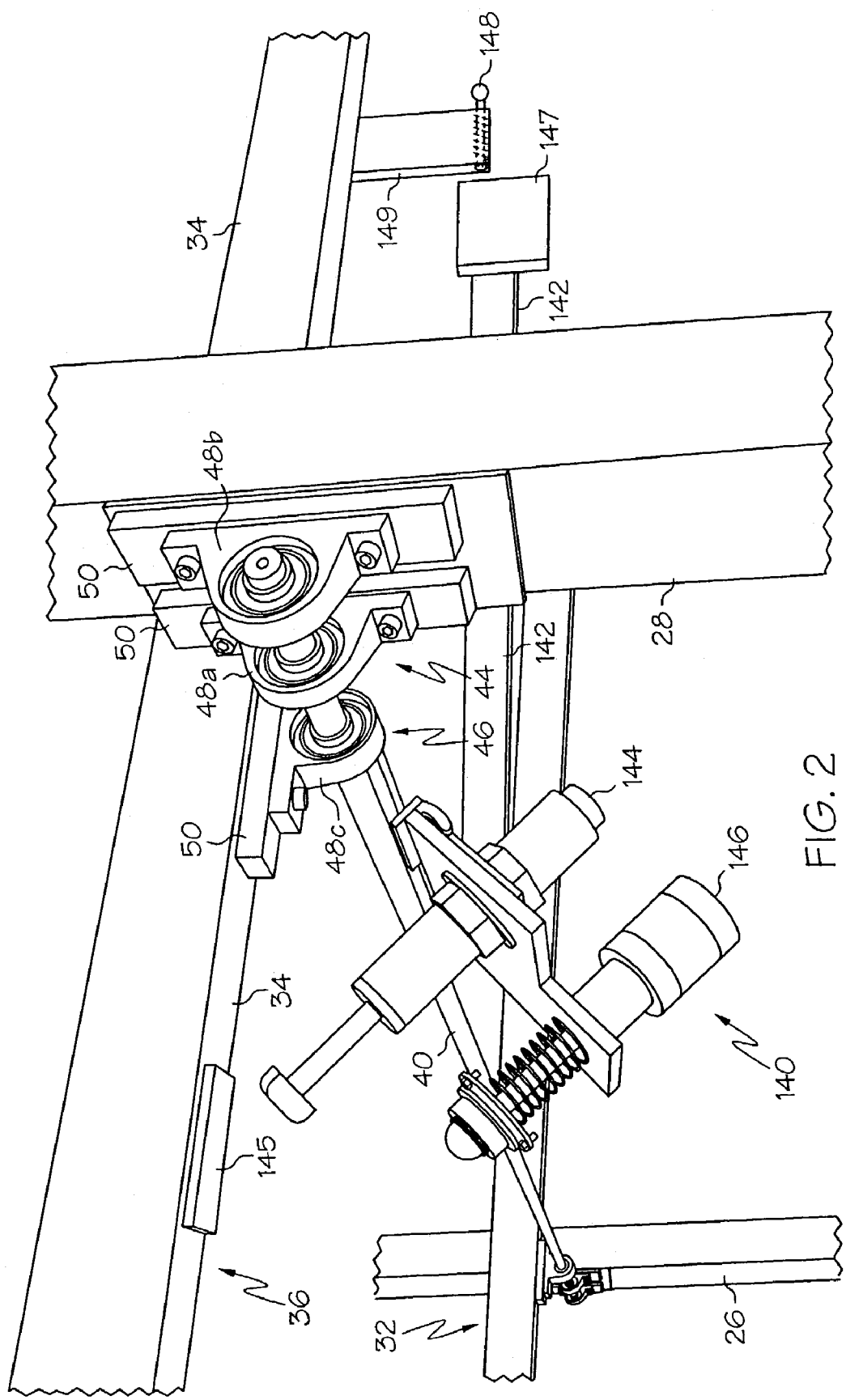

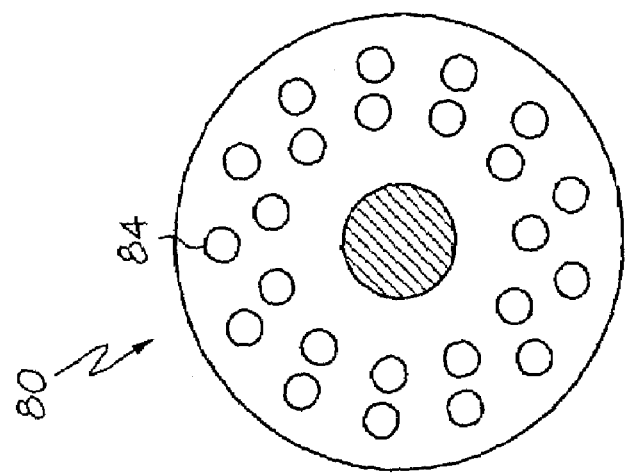
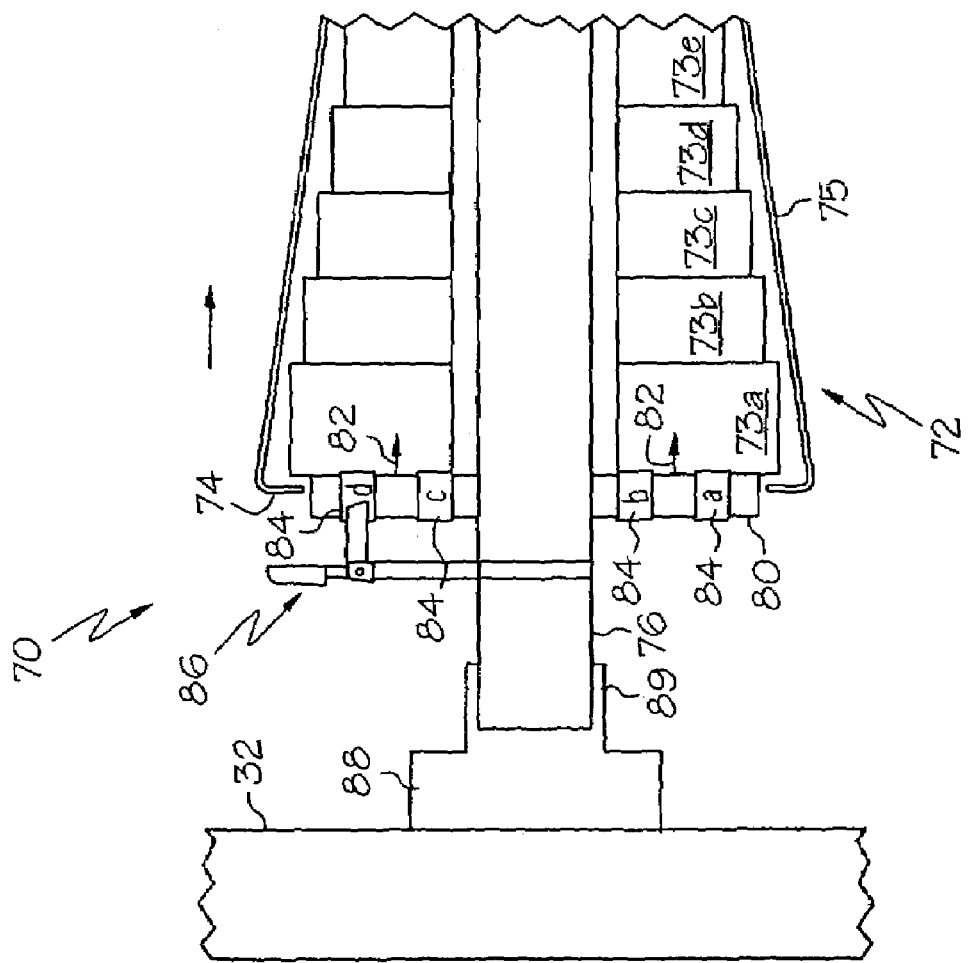

VEHICLE SURFACE PREPARATION APPARATUS

FIELD OF THE INVENTION

This invention relates to an apparatus for removing dust and particles from the surface of a vehicle in preparation for painting.

BACKGROUND OF THE INVENTION

Various apparatuses for removing dust from a vehicle during the production process and prior to painting have been known in the industry. One such apparatus includes the "feather duster" device and includes an adjustable horizontal wiping unit and vertical wiping heads attached to a frame and positioned to wipe a vehicle clean of dust as the vehicle moves along an assembly line. There appears to be many issues with the feather duster apparatus. First, power assisted auxiliary air cylinders are needed to raise and lower the horizontal wiping unit and motors are often required to rotate the horizontal and vertical wiping heads. Aside from the increased cost of maintaining the air cylinders and motors, workers are often required to manually operate such apparatuses to insure complete surface preparation.

In addition, as a feather duster apparatus does not actually use "feathers," but uses yarn as the wiping media, there is a greater chance that yarn seeds and previously removed dirt caught in the media will be deposited or re-deposited onto the surface of the automobile. To solve this problem, rotating horizontal wipers covered with tack cloth have been implemented to minimize redeposition of removed materials. However, because the horizontal and vertical wipers rotate, dust and other particles may be ejected and redeposited on the vehicle surface during rotation.

Accordingly, there is a desire for a passive vehicle surface preparation apparatus having stationary top (horizontal) and side (vertical) wipers for effectively removing dust and other particles from the surface of a vehicle prior to painting.

SUMMARY OF THE INVENTION

Accordingly, the present invention is intended to address and obviate problems and shortcomings and otherwise improve previous vehicle preparation apparatuses.

To achieve the foregoing and other objects and in accordance with the exemplary embodiments of the present invention a passive vehicle surface preparation apparatus is provided which comprises a mounting assembly and a support arm assembly. The support arm assembly may be pivotally connected to the mounting assembly. The vehicle preparation apparatus further comprises a first wiper assembly attached to the support arm assembly, wherein the wiper assembly has a stationary preparation surface.

To still further achieve the foregoing and other objects of the present invention, a passive vehicle surface preparation apparatus comprises a mounting assembly having mounting posts, a support arm assembly including two support arms having first and second ends, each of the support arms being pivotally connected to one of the mounting posts. The vehicle preparation apparatus further comprises a horizontal wiper assembly connected to the first ends of the support arms. The wiper assembly comprises a wiper with an axle connected to at least one of the support arms, at least one endplate positioned adjacent the periphery of the wiper having a plurality of apertures, and a lock positioned adjacent one of the support arms and configured to engage at least one of the apertures of the endplate for selectively securing the wiper in a stationary position. In addition, the vehicle preparation apparatus comprises a balance assembly attached adjacent the second end of at least one of the support arms.

To yet further achieve the foregoing and other objects in accordance with other exemplary embodiments of the present invention, a method for preparing vehicle surfaces for painting is provided which comprises the steps of securing a wiper in a first stationary position, moving at least one vehicle through a preparation assembly, contacting the surface of the vehicle with the wiper as the vehicle moves through the preparation apparatus, and then rotating the wiper to a second stationary position.

Still other embodiments, combinations, advantages and objects of the present invention will become apparent to those skilled in the art from the following descriptions wherein there are shown and described alternative exemplary embodiments of this invention for illustration purposes. As will be realized, the invention is capable of other different aspects, objects and the embodiments all without departing from the scope of the invention. Accordingly, the drawings, objects, and description should be regarded as illustrative and exemplary in nature only and not as restrictive.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIG. 2 is a partial perspective view illustrating an exemplary embodiment for securing the support arm assembly to the mounting assembly in accordance with the present invention;

FIG. 3 is an enlarged partial sectional view of an exemplary wiper assembly in accordance with the present invention;

FIG. 4 is an end view illustrating an exemplary endplate having a plurality of staggered apertures in accordance with the present invention;

DETAILED DESCRIPTION OF EXEMPLARY EMBODIMENTS

Figure 1:
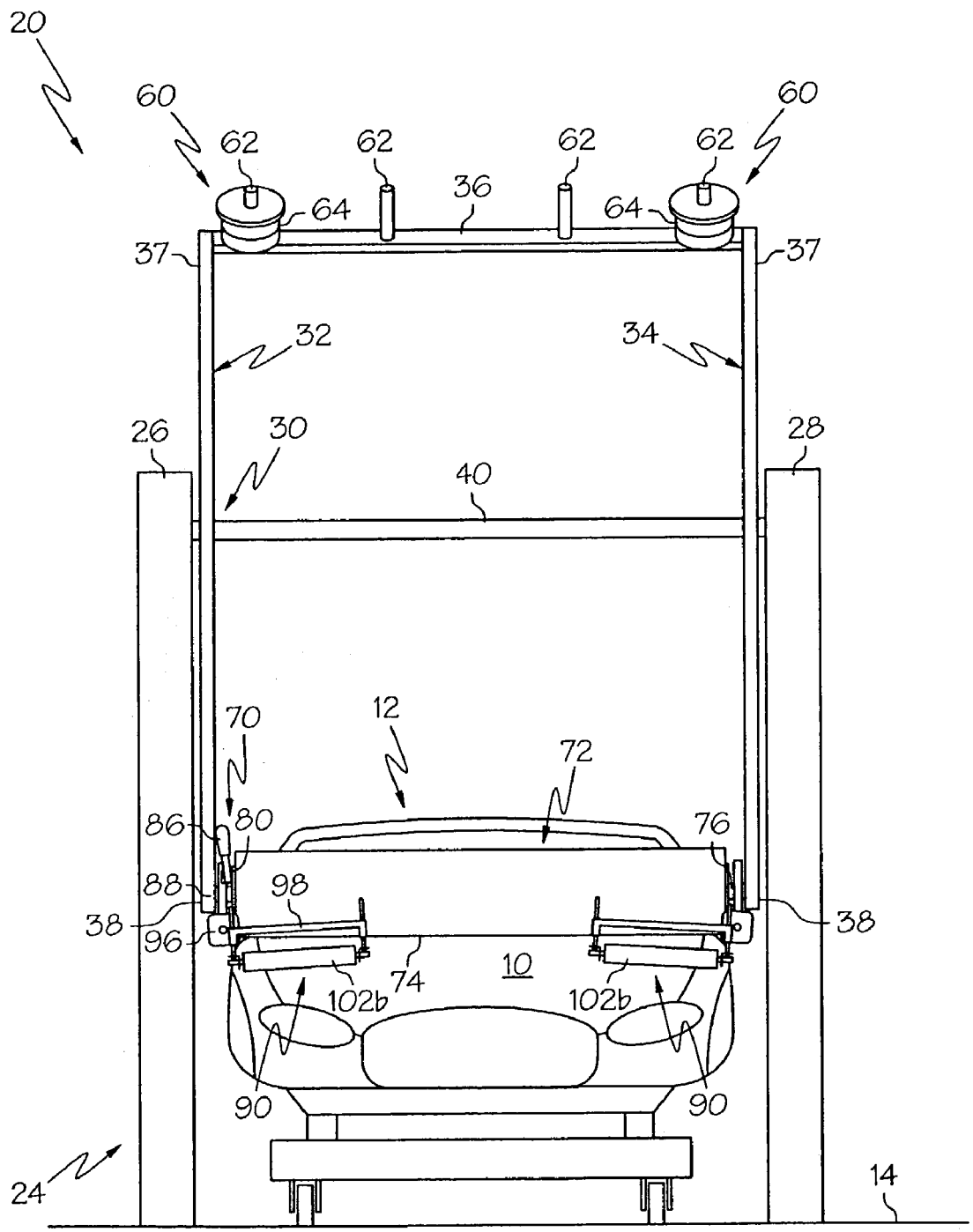
FIG. 1 is a front elevation view of an exemplary vehicle preparation apparatus made in accordance with the present invention.

Referring to the drawing figures in detail, wherein like numerals indicate the same elements throughout the drawing figures, FIG. 1 illustrates an exemplary surface preparation apparatus 20 as it might appear in use for preparing the surface 10 of a vehicle 12. Apparatus 20 is shown in this example as comprising a mounting assembly 24, a support arm assembly 30, a balance assembly 60 and a wiper assembly 70. As later discussed herein, because the wiper assembly 70 may engage and move along the vehicle 12 without the need for hydraulic cylinders and motors, the apparatus of the present invention is considered to be "passive."

Mounting assembly 24 may comprise first and second mounting posts 26 and 28 extending from a surface 14 and spaced from one another to allow a vehicle to pass therebetween. Mounting posts 26 and 28 may be comprised of steel or any other durable material and can be provided in any of a variety of sizes and shapes according to the size of vehicles passing through the assembly. In one embodiment, for example, mounting posts 26 and 28 may be comprised of 4×4" (10 cm×10 cm) steel tubing approximately 7' (2.1 m) in height.

Support arm assembly 30 may be disposed between and pivotally connected to mounting posts 26 and 28 by support arm axle 40. The support arm assembly 30 itself may comprise first and second support arms 32 and 34 having first and second ends (e.g., 37, 38) and may be secured in a spaced relation to one another by a beam 36 connected adjacent their second ends 37. In another embodiment, support arm assembly 30 may comprise but one support arm pivotally connected to a single mounting post.

Components of the support arm assembly 30 may be provided of steel or any other appropriately strong and durable material and may exist in a variety of sizes and shapes according to the sizes selected for mounting posts 26 and 28. In one embodiment, for example, support arms 32 and 34 may be comprised of 2×4" (5 cm×10 cm) steel tubing approximately 9' (2.7 m) in length.

As previously indicated, support arm assembly 30 may be pivotally connected to mounting posts 26 and 28 by support arm axle 40. As best illustrated in FIG. 2, first collar assembly 44 may be secured to each mounting post 26 and 28 and second collar assembly 46 may be secured to each support arm 34. Collar assemblies 44 and 46 may also be secured to mounting post 26 and support arm 32.

First collar assembly 44 may comprise two bearing plates 48a and 48b secured to a saddle 50 wherein each saddle 50 may be mounted directly to the mounting posts 26 and 28. Second collar assembly 46 may comprise one bearing plate 48c secured to a saddle 50 wherein each saddle 50 may be mounted directly to support arms 32 and 34. In another embodiment, saddle 50 may be mounted to an additional steel plate which is first connected to the mounting posts 26 and 28 and support arms 32 and 34. As illustrated in FIG. 2, first collar assembly 44 may comprise two bearing plates 48a and 48b to provide, for example, further support for support arm assembly 30. Bearings 48a-48c may be configured so that the support arm axle 40 may be positioned in the collar of each bearing 48a-48c. As illustrated in FIG. 2, the support arm axle 40, carrying support arm assembly 30 and pivotally connected to mounting posts 26 and 28, may extend across the entire length of the preparation apparatus. In another embodiment, the center of support arm axle 40 may be removed thereby providing an access opening so that taller vehicles may pass through the preparation assembly. Such configuration may essentially eliminate axle 40 as axle 40 would be replaced by bearing supports at either end of the support arms.

As a result of the support arm axle 40, collar assembly 44 and 46 configuration, support arm assembly 30 may pivot about mounting posts 26 and 28. If desired, collar assemblies 44 and 46 may be configured to be moved up and down relative to mounting posts 26 and 28 and/or support arms 32 and 34, and therefore, selectively position support arm assembly 30 longitudinally along the mounting posts 26 and 28. Such may be accomplished, for example, by integrating a set screw (not shown) with each collar assembly 44 and 46. In addition, while collar assemblies 44 and 46 have been discussed herein, it is contemplated that the support arm assembly 30 of the present invention may be pivotally connected to the mounting posts 26 and 28 in any of a variety of ways including, but not limited to, mounting support arm assembly 30 to support arm axle 40 and pivotally connecting support arm axle 40 directly to mounting posts 26 and 28. As such, those of ordinary skill in the art could arrange for pivotal mounting of support arm assembly 30 on one or more mounting posts in many ways in accordance with the present invention.

Referring again to FIG. 1, preparation apparatus 20 may further comprise a horizontal wiper assembly 70 secured adjacent the first end 38 of the support arm assembly 30. While FIG. 1 illustrates the wiper assembly 70 connected to both support arms 32 and 34, it is contemplated that where support arm assembly 30 comprises but one support arm (previously discussed), wiper assembly 70 may be secured to that single support arm. Referring to FIG. 3, a partial sectional view of an exemplary wiper assembly is illustrated. For purposes of clarity, cross-hatching has been eliminated. The wiper assembly 70 may be pivotally secured to the support arms (32 shown) by, for example, securing an axle mount 88 to support arms (32 shown), and inserting wiper axle 76 into a collar 89 of axle mount 88. In another embodiment, any mounting arrangement may be utilized including, but not limited to mounting axle 76 directly onto support arms.

The axle mount 88 may hold wiper axle 76 in a stationary position while wiper 72 is free to rotate about wiper axle 76. As illustrated in FIGS. 1 and 3, wiper assembly 70 may comprise a horizontal wiper head 72, an endplate 80 and a lock 86. As best seen in FIG. 3, an outer covering 74 may be installed around the wiper head 72. The covering 74 may be tack cloth or any other material or arrangement capable of effectively and appropriately removing dirt and/or dust from a vehicle surface. In another embodiment, wiper head 72 may itself be configured to effectively remove dirt and/or dust from a vehicle surface.

Figure 5:
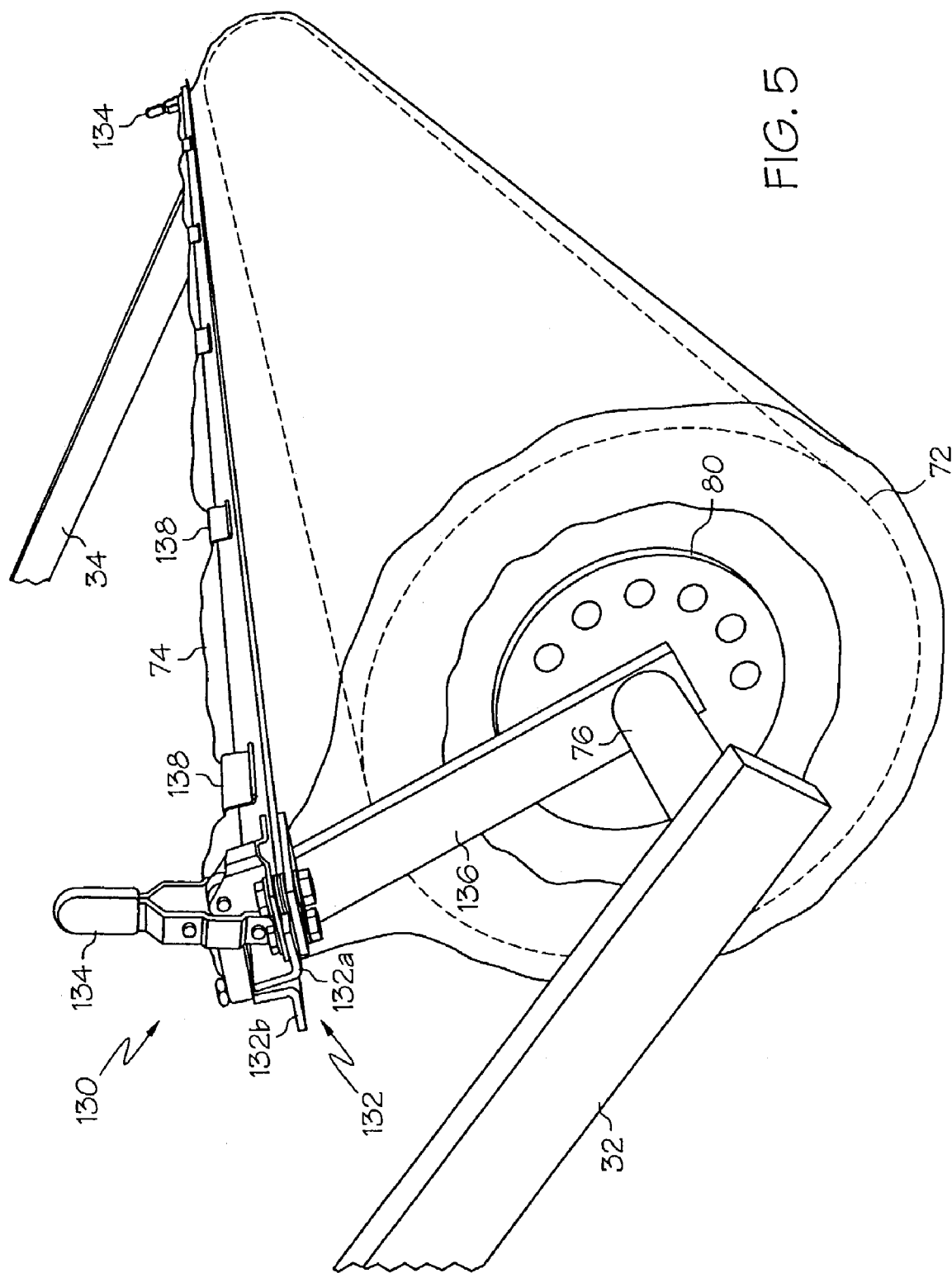
FIG. 5 is a partial perspective view of an exemplary wiper and gripping assembly in accordance with the present invention.

The covering 74 may be pulled flush and taut with the wiper head 72 by one or more draw strings (not shown). In another embodiment, wiper 72 may be expandable/contractible so that it may be fitted to a particular covering 74. As illustrated in FIG. 5, a gripping assembly 130 may be used to pull any excess covering 74 taut with the wiper. The gripping assembly 130 may comprise two grippers 132a and 132b and clamps 134. The gripping assembly 130 may be rotatably secured to wiper axle 76 and rigidly secured to endplate 80 by gripping assembly member 136 so that as the endplate 80 and wiper 72 move angularly, the gripping assembly 130 moves accordingly. However, it should be understood from the discussion to follow that as the gripping assembly member 136 may be secured to the endplate, gripping assembly 130 may become stationary when wiper assembly is locked into a stationary position.

In use, excess covering 74 may be manually pulled between grippers 132a and 132b until flush and taut against wiper 72. Force may be applied between said grippers 132a and 132b by clamps 134 to secure covering 74 in place. If desired, removable fasteners 138 may added to increase the force between the grippers 132a and 132b and better secure the covering 74 against the wiper 72.

Referring again to FIG. 3, the diameter of horizontal wiper 72 may decrease (or taper) from the lateral ends toward the center. Such design may be provided by, for example, joining adjacent segments 73a-73e of varying size to one another so that segments toward the center of the wiper 72 (e.g. 73e) have a smaller diameter than the segments toward the end of the wiper 72 (e.g. 73a). If desired, each segment 72a-72e may be padded in order to cushion the wiper's initial engagement with the vehicle. In addition, each segment 72a-72e may comprise an aperture or cutout to receive the wiper axle 76. While it has been found that such wiper head design is beneficial for wiping a greater surface area of the vehicle, it is contemplated that the wiper 72 may be configured in a variety of different embodiments including, but not limited to a solid polymer roll, a wound sheet of cloth or foam, or be configured in a variety of shapes including a generally polygon, triangle or square conformation.

Wiper assembly 70 may include a plurality of predetermined rotational positions about an axis, whereby a plurality of different passive wiper surfaces can be selected and one-by-one moved into operational position by rotation of the wiper. Once moved into a predetermined rotational position, the wiper is prevented from rotating during surface contact so that the horizontal wiper passively (unmovingly) contacts the surface to be prepared.

For example, wiper assembly 72 may comprise an endplate 80 secured to the wiper 72 by inserting one or more locking tabs 82 associated with the endplate 80 into one or more locking apertures associated with the first segment 72a of the wiper 70. In another embodiment, endplate 80 may be secured to both lateral ends of wiper 72. Endplate 80 may be generally circular in shape resembling the outer circumference of wiper 72 and may be comprised of steel, plastic or any other durable material. However, it is contemplated that endplate 80 may comprise any shape configured to be secured to wiper 72 and receive a lock 86 including, but not limited to a unitary molded piece. In addition, endplate 80 may comprise a plurality of apertures 84 and for selectively receiving lock 86 to secure wiper assembly 70 in a stationary and non-rotating position. Lock 86 may comprise a lever lock mechanism, brake arrangement or any other such apparatus configured to engage one or more apertures 84 of endplate 80 or to otherwise selectively prevent movement of the wiper head in use. In addition, lock 86 may be mounted directly to axle 76 in such a way to prevent rotation of the lock 86 about the axle 86. In another embodiment, the lock 86 may be mounted to any apparatus associated with the wiper 72 so as to provide a stationary apparatus for engagement with the endplate 80 or wiper 72.

It is envisioned by the present invention that the wiper 72 may be free to rotate about wiper axle 76 in order to selectively adjust the wiper 72 to effectively provide a second or subsequent wiping surface once the first wiping surface is worn or dirty, at which time the wiper may be again locked into a stationary position. For example, as illustrated in FIG. 3, lock 86 is engaged in aperture 84d of endplate 80. Therefore, wiper 72 is fixed in a stationary position providing a single surface (e.g., 75) for wiping the surface of a vehicle. In use, when the surface 75 becomes worn or dirty, a worker may disengage lock 86 from aperture 84d, rotate the wiper head 72 about axle 76 to a second fixed position and reengage lock 86 with aperture 84c thereby providing a new wiping surface. In another embodiment, a brake may be associated with endplate 80 and connected to a controller and sensor so that when wiping surface 75 becomes worn, as determined by the sensor, controller may release brake and allow endplate/wiper to rotate into a second or subsequent position. Such arrangement may eliminate the need to monitor the preparation apparatus of the present invention.

As previously stated, wiper 72 may be free to rotate around axle 76 such as when lock 86 is not engaged with one of apertures 84a-d of endplate 80. However, it should be understood that while the present invention may be configured to provide a stationary wiping surface, in another embodiment, wiper 72 may be free to rotate about wiping axle 76 as a vehicle passes through the preparation apparatus.

Wiper 72 may be capable of multiple fixed positions according to the number of apertures 84 located in the endplate 80. For example, referring to FIG. 4, endplate 80 may comprise a plurality of apertures 84 aligned in a staggered formation. Such staggered formation may be desired in order to maximize use of as many wiping surfaces as possible. As previously discussed, the process might further include an automatic monitoring system to determine when a wiping surface needs to be renewed, and could similarly include equipment to move the wiper to expose an effectively new wiping surface or to replace covering 74. As the preparation apparatus 20 of the present invention does not utilize hydraulic cylinders or motors to rotate wiper assembly 70, the preparation apparatus 20 is said to be passive.

Referring again to FIG. 1, preparation apparatus 20 may further comprise a balance assembly 60 positioned adjacent the second end 37 of support arm assembly 30 and may be utilized to selectively preload wiper assembly 70. The preload should be such that allows the wiper assembly 70 to move upwardly and downwardly to follow the vehicle contours while remaining in wiping contact as the vehicle passes through the apparatus. In a basic embodiment, balance assembly 60 may comprise a post 62 with one or more weights 64 positioned thereon. If desired, weights 64 may be secured to posts 62 with one or more cotter pins or other locking arrangements. In addition, any number of posts 62 may be positioned along beam 36 for accepting any amount of weight (e.g. 40 lbs or 18.2 kg). In a more complex embodiment, fluid may be introduced into a hollow support arm assembly and regulated to counterbalance or preload wiper assembly 70. As the preparation apparatus 20 does not utilize hydraulic cylinders or motors to actuate and/or balance support arms 32 and 34, the preparation apparatus 20 is said to be passive.

While FIG. 1 illustrates balance assembly 60 positioned on beam 36, it is contemplated that balance assembly 60 may be positioned at any position along arm assembly 30, such as any location adjacent or near the second end of the support arm assembly 30 and/or along support arm 32 or 34. For example, in an embodiment where support arms 32 and 34 extend beyond beam 36, it may be desired to place balance assembly 60 on the outermost ends 37 of support arms 32 and 34 thereby providing an effective preload of the wiper assembly 70. In addition, balance assembly 60 may be slidable or repositionable about support arms 32 and 34 to achieve desired preload weighting. By using the balance assembly 60 and wiper assembly 70 to dial in a predetermined (and adjustable) preload on the wiping surface, effective surface preparation can be optimized.

Figure 6:
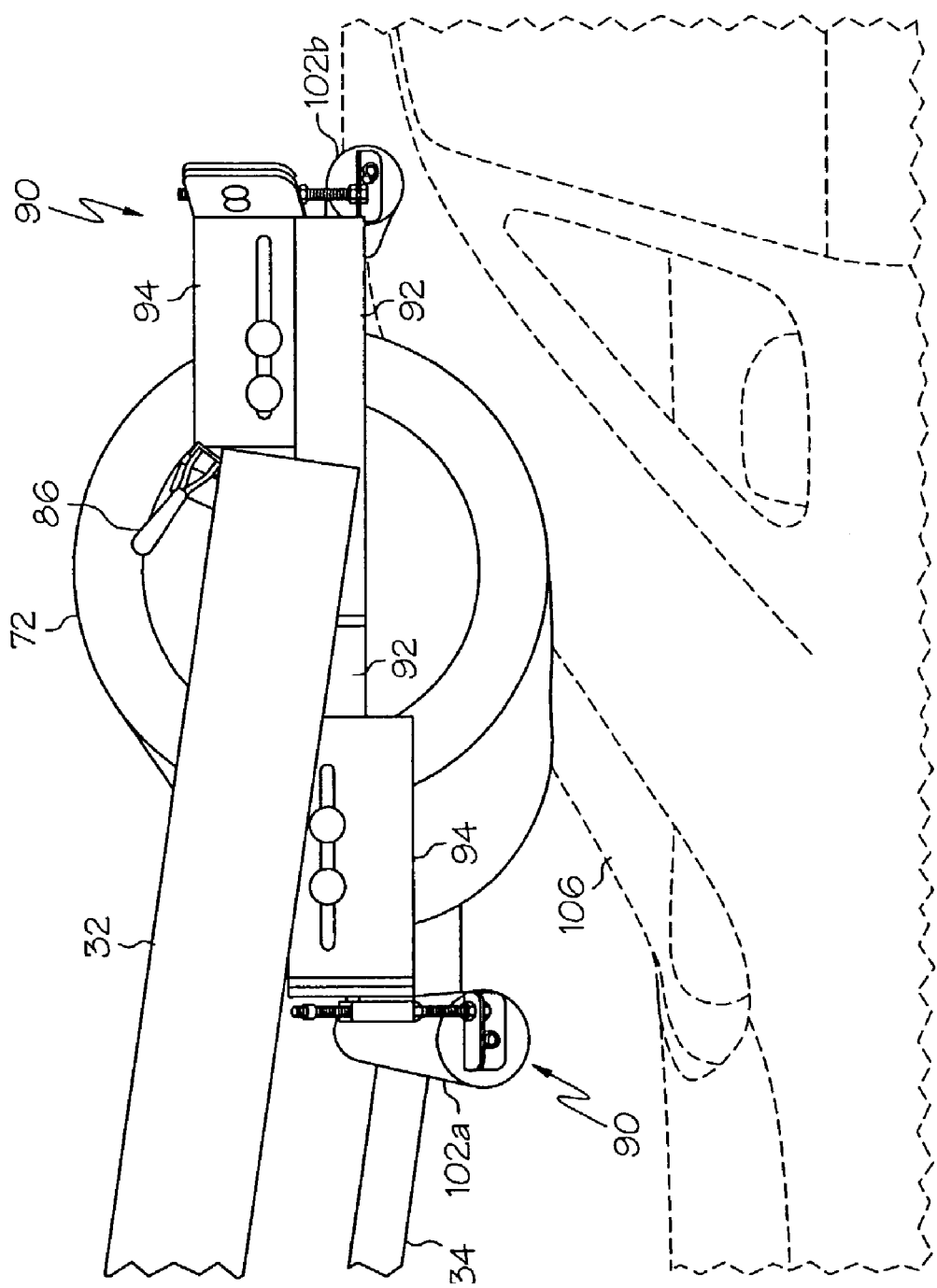
FIG. 6 is a partial perspective view of exemplary roller assemblies in accordance with the present invention.

Still referring to FIG. 1, the apparatus of the present invention may include one or more roller assemblies 90 to assist in lifting and/or guiding the wiper 72. FIG. 6 illustrates one such roller assembly 90 with two rollers 102a and 102b attached at opposite ends. While not necessary, it is contemplated that a roller assembly 90 be associated with each lateral end of wiper assembly 70.

Figure 7:
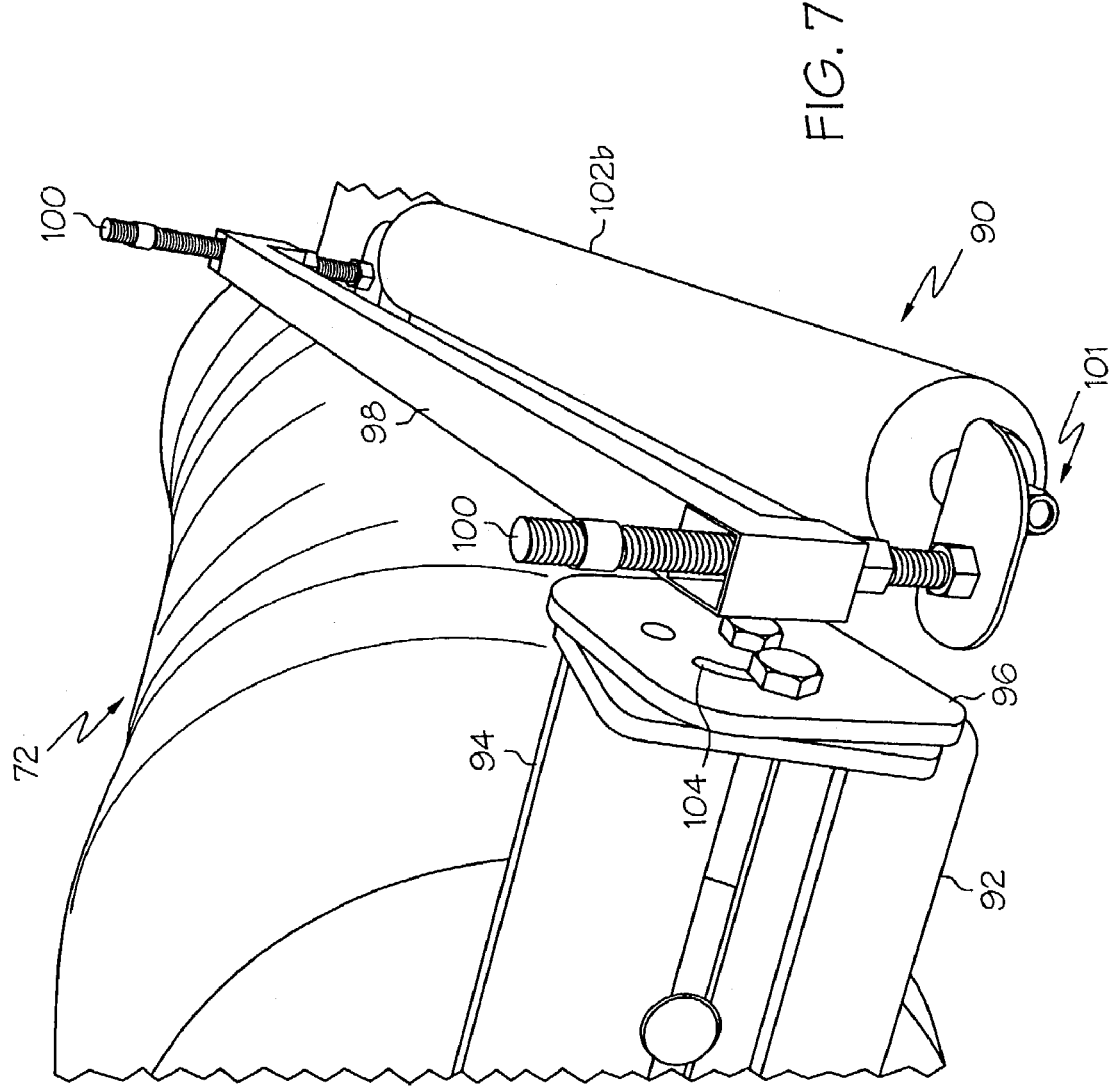
FIG. 7 is a partial perspective of an individual roller assembly as illustrated in FIG. 6 and in accordance with the present invention.

Roller assembly 90 may comprise a roller assembly frame 92 secured to the wiper axle (76 in FIG. 3). In another embodiment, roller assembly frame 92 may alternatively be secured to support arm 32. The roller assembly frame 92 may be comprised of steel or other durable material. As illustrated in FIG. 6, roller assembly 92 may further comprise extension arms 94 wherein each extension arm 94 may be secured to the front and rear lateral side of assembly frame 92. As best seen in FIG. 7, each extension arm 94 may be further secured to a roller plate 96. Roller plate 96 may provide a surface for securing roller mount 98 thereto such as by a weld, bolts or any other fastening arrangement. In addition, roller mount 98 may comprise two adjusting screws 100 associated with a roller axle assembly 101 for adjustably securing a roller 102b thereto. Roller 102b may be comprised of polymer, rubber or any other material capable of guiding the wiper along a vehicle surface without harming the surface. In another embodiment, roller 102b may also comprise a tack material or surface treatment to further assist in removing dust and dirt from the surface. Also, it should be understood that while a single roller 102b is illustrated, rollers 102a and 102b could be provided as a plurality of rollers or segments. In addition, rollers may comprise any size and/or be arranged in a staggered formation to interface with a variety of complex designs.

As illustrated in FIGS. 6-7, the roller assembly 90 is capable of adjustment according to the contours of the vehicle. Adjustment might be desired when vehicles of different shapes and contours pass through the preparation assembly. For example, extension arms 94 may be moved forward and rearward about the roller frame 92 thereby moving the rollers 102a and 102b forward and rearward, respectively. In addition, as roller plate 96 comprises a sliding aperture 104, roller plate 96 may be adjusted about extension arm 92 thereby providing angular adjustment of the rollers 102a and 102b. Also, adjusting screws 100 not only adjust rollers 102a and 102b upward and downward, but may also provide angular adjustment of the rollers 102a and 102b. It should be understood that the description of the roller assembly herein comprises but one embodiment. In another embodiment, the roller assembly, for example, may comprise a unitary structure with one or more rollers secured thereto and may be secured to the preparation apparatus in a number of arrangements. In addition, different rollers may be utilized (i.e. larger, smaller, variable shapes, lengths, hardness, and the like).

Referring to FIG. 6, roller assembly 90 may be used to guide the wiper 72 onto and off of areas of the vehicle surface and/or to follow changing contours. For example, as vehicle approaches the preparation assembly, roller 102a may be used to guide wiper 72 over the opening for the windshield. Such guiding efforts may be useful to prevent the wiper 72 from sliding into the windshield opening and snagging on metal. Alternatively, roller 102a may engage the hood and/or side panels of the vehicle thereby lifting the wiper 72 onto the hood of the vehicle. As seen in FIG. 6, as the vehicle progresses through the preparation assembly, roller 102b may engage the vehicle to prevent the wiper 72 from slipping into the opening 106 for the rear window, or otherwise to better follow the contours of the vehicle surfaces in order to optimize the surface preparation.

Referring again to FIG. 2, the preparation apparatus may further comprise a swing halt assembly 140 to prevent swing arm assembly 30 from swinging too far in any direction, or to the ground. Swing halt assembly 140 may be positioned adjacent one mounting post 28, as illustrated in FIG. 2, or may be positioned adjacent both mounting posts 26 and 28. Swing halt assembly may comprise a halt bar 142 having forward and rearward ends rigidly secured to mounting post 26. The forward end of halt bar 142 may comprise one or more shock absorbers to receive the swing arm assembly 30 on its downward rotation. As illustrated in FIG. 2 a hydraulic shock absorber or damper 144 and spring shock absorber 146 may be implemented to receive support arm assembly 30. For example, as a vehicle moves through preparation apparatus, the swing arm will eventually rotate downward when the vehicle is nearly through the apparatus and the wiper assembly disengages from the vehicle surface. As illustrated in FIG. 2, damper 144 first engages support arm 34 to initially slow support arm assembly through its downward rotation followed by spring shock absorber 146. If desired, a cushion plate 145 may be secured to support arm 34 to receive damper 144. Of course, the position of the shock absorbers may be reversed, or in another embodiment, swing halt assembly 140 may be secured directly to swing arm and engage mounting post 28 through its downward rotation.

There may be occasions where it is desired not to wipe dust and dirt from the surface of a vehicle. On such occasion, the preparation apparatus should be configured to hold the support arm assembly 30 in a horizontal (upward) position relative to the ground so that a vehicle may pass through unwiped. As such, the rearward end of swing halt bar 142 may comprise a halt lock plate 147 configured to receive spring lockpin 148 of support arm lock plate 149. As illustrated in FIG. 2, support arm 34 of support arm assembly 30 may be rotated horizontally toward halt lock plate 147. Once the support arm lock plate 149 is near halt lock plate 147, lockpin 148 may be pulled so that support arm lock plate 149 may pass by halt lock plate 147. Once the support arm lock plate 149 has passed halt lock plate 147, lockpin 148 may be released so that support arm assembly 30 may not rotate downward. It should be understood that the support arm assembly may be secured in a horizontal position relative to the ground in a variety of arrangements including, but not limited to providing a powered braking system or attaching a chain or rope between second end of support arm assembly and the ground.

Referring to the exemplary illustrations of FIGS. 1-7, the present invention is intended to provide a passive surface preparation apparatus for wiping a vehicle free of dirt and dust prior to painting without the use of motors or hydraulic cylinders to actuate support arms 32 and 34 or rotate wiper assembly 70. As described herein, such apparatus may be achieved by counterbalancing or preloading the wiper assembly 70 and other components such as roller assembly 90 with balance assembly 90. However, it should be understood that while balance assembly 90 may be desired to counteract or preload the wiper assembly 70, balance assembly 90 may not be essential in lieu of components such as roller assembly 90 and swing halt assembly 140, whereby the wiper assembly 70 may be properly positioned and preloaded to engage a vehicle and be guided along the same.

Figure 8:
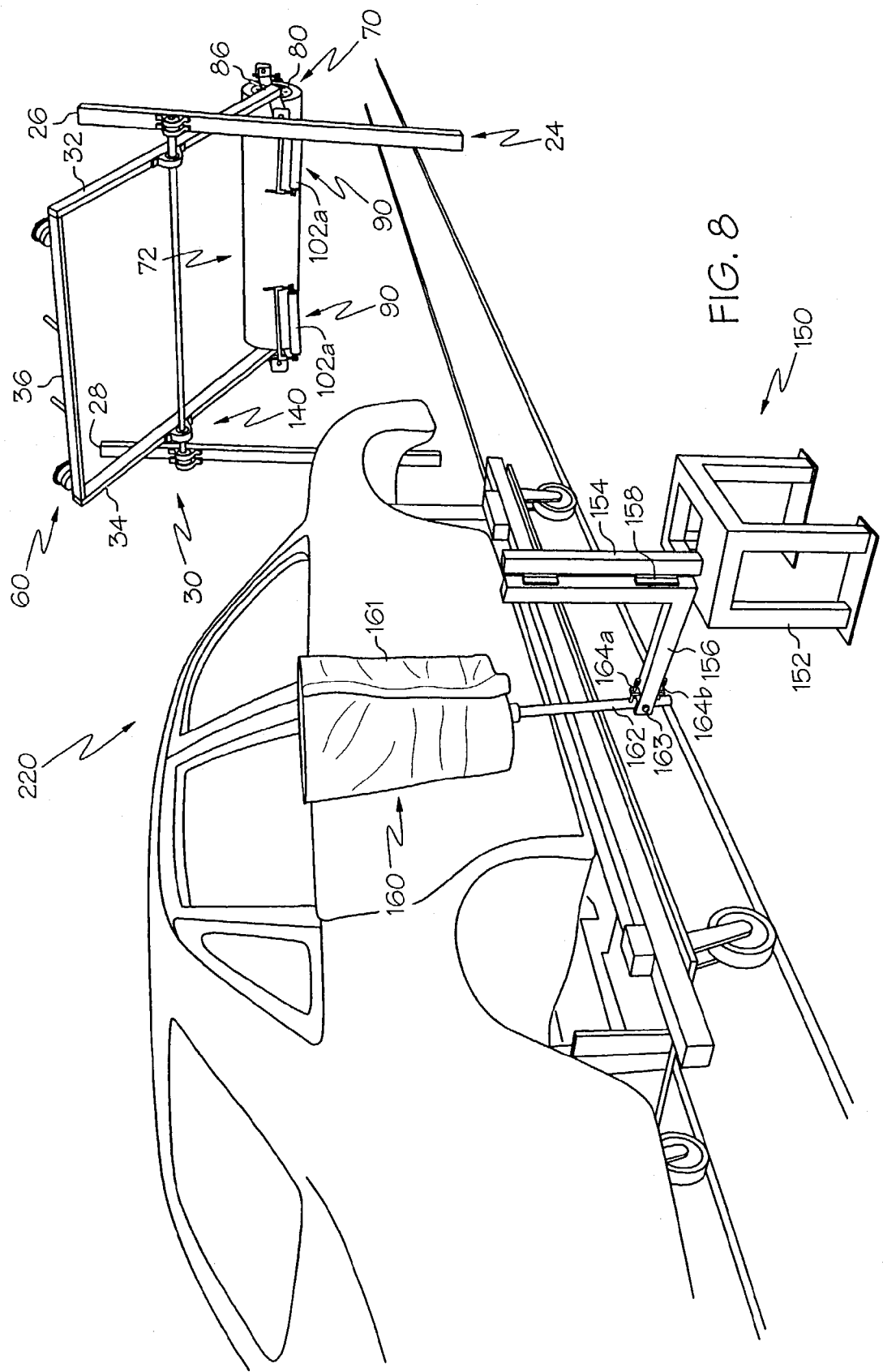
FIG. 8 is a partial side perspective view of an exemplary vehicle preparation apparatus incorporating a vertical wiper assembly in accordance with the present invention.

Referring to FIG. 8, the preparation apparatus 20 of the present invention may also include one or more vertical wiping assemblies 150 located adjacent the mounting assembly 24 of the horizontal wiping assembly 70. The vertical wiping assembly 150 may be positioned to wipe the vehicle before the vehicle engages the horizontal wiping assembly, while the vehicle is engaged with horizontal wiping assembly or after.

The vertical wiping assembly 150 may comprise a base 152 with an upwardly extending mount post 154. A vertical wiper support arm 156 may be secured to the mount posts 154 with, for example, one or more hinges 158. In one embodiment, hinges 158 may be spring hinges configured to bias vertical wiper support arm 156 in a starting position. In addition, hinges may be configured with a swing stop to prevent vertical wiper support arm 156 from rotation beyond a certain point.

The vertical wiper assembly 150 may also comprise a vertical wiper 160 connected to an extension post 162, which in turn may be secured to vertical wiper support arm 156. It should be understood that vertical wiper 160 can extend from a variety of base structures. If desired, vertical wiper arm 162 may comprise a plurality of apertures for receiving bolt 163 so that vertical wiper head may be moved upward and downward relative to vertical wiper base 152. In another embodiment, vertical wiper arm 162 may be threaded for rotatable vertical adjustment. Vertical wiper head 160 may be further selectively positioned to engage the vehicle by adjusting spring screws 164a and 164b thereby manipulating vertical wiper arm 162.

In one embodiment, vertical wiper 160 may be configured similar to horizontal wiper assembly (70 in FIG. 3). For example, vertical wiper may be comprised of adjoining segments of varying sizes. Also, similar to the horizontal wiping head 72, the vertical wiping head 160 may be comprised of segments utilizing tacky cloth covering 161. Again, while it has been found that such wiper head design is beneficial for wiping a greater surface area of the vehicle, it is contemplated that vertical wiper 160 may be configured in a variety of different embodiments including, but not limited to a solid polymer roll or a wound sheet of cloth or foam, or configured in a variety of shapes including a polygon, triangle or square.

In addition, similar to horizontal wiper, vertical wiper 160 may be configured to provide selective rotation about stationary positions. For example, vertical wiper 160 may further comprise an endplate with a plurality of apertures for receiving a lock thereby fixing vertical wiper assembly in a stationary position. Vertical wiper 160 may be free to rotate about a vertical wiper axle in order to adjust the vertical wiper 160 to provide a second wiping surface once the first wiping surface is worn or dirty, at which time the wiper may be locked back into a stationary position. In another embodiment, vertical wiper 160 may freely rotate about a vertical axle. However, in either embodiment, as the vertical wiper assembly does not utilize hydraulic cylinders or motors to load it or actively move it against a surface to be prepared, it should be understood that the vehicle surface preparation apparatus 220 illustrated in FIG. 8 is of a passive nature.

Another aspect of the present invention is that more than one vertical wiper assemblies 150 may be employed. Not only can a vertical wiper assembly 150 be employed on each side of the vehicle, but two or more vertical wiper assemblies 150 may be employed on each side of the vehicle and function together to wipe different parts of the side panels. For example, where two or more vertical wiping assemblies are employed on each side of the vehicle, vertical wipers 160 may be set at different heights relative to the vehicle passing through the preparation apparatus 220 (e.g. the first vertical wiper may be set to wipe the lower surface while the second vertical wiper may be set to wipe a higher surface). In addition, the angle of the vertical wipers 160 may be set differently by the spring screws (see 164a and 164b in FIG. 8). As such, the combination of horizontal wiper 72 and vertical wipers 160 provide an effective apparatus for wiping dirt and dust from the surface of a vehicle prior to painting. In addition, as the apparatus of the present invention is not powered by motors or hydraulic cylinders, the apparatus can operate with little supervision and maintenance.

As will be understood from the description herein and the examples of FIGS. 1 through 8, a method for wiping vehicles clean from dirt and dust prior to painting may comprise the steps of securing a horizontal wiper 72 and vertical wipers 160 in a first stationary position as described above. Once the wipers assemblies 72 and 160 are set in stationary positions, a vehicle may move down the line and into the inventive apparatus, wherein the vehicle first contacts vertical wipers 160 and then progresses to horizontal wiper 72. As previously discussed, however, vertical wipers 160 may be positioned downstream from or near the horizontal wiper 72 in other embodiments. As the vehicle passes by the horizontal wiper 72, one or more roller assemblies 90 may guide the horizontal wiper 72 onto and/or over parts of the vehicle such that all surfaces to be prepared are adequately accessed. After a number of vehicles have passed through the surface preparation apparatus 220, horizontal wiper 72 and/or vertical wipers 160 may be rotated into a second stationary position to provide a clean surface for wiping.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art of the above teaching. For example, the vehicle surface preparation apparatus in accordance with the present invention may be implemented in a variety of different arrangements and can include wipers of various sizes and shapes. Accordingly, while some of the alternative embodiments of the vehicle surface preparation apparatus have been discussed specifically, other embodiments will be apparent or relatively easily developed by those of ordinary skill in the art. Accordingly, this invention is intended to embrace all alternatives, modifications and variations that have been discussed herein, and others that fall within the spirit and scope of the claims.

What we claim is:

1. A passive vehicle surface preparation apparatus comprising:
   (a) a mounting assembly having at least two mounting posts;
   (b) a support assembly comprising two support arms having first and second ends, each of said support arms pivotally connected to one of said mounting posts;
   (c) a horizontal wiper assembly connected adjacent said first ends of said support arms, said wiper assembly comprising a horizontal wiper with an axle connected to at least one of said support arms and an endplate lock arrangement configured to selectively secure said wiper in a stationary position; and
   (d) a balance assembly attached adjacent said second end of at least one of said support arms.

2. The passive vehicle surface preparation apparatus of claim 1, further comprising at least one roller assembly adjacent said horizontal wiper for guiding said wiper along said surface.

3. The passive vehicle surface preparation apparatus of claim 2, wherein said roller assembly is configured to be adjustably positioned according to the contours of said vehicle surface.

4. The passive vehicle surface preparation apparatus of claim 1, further comprising a first vertical wiper adjacent said mounting assembly, said first vertical wiper having a stationary preparation surface.

5. The passive vehicle surface preparation apparatus of claim 4, further comprising a second vertical wiper adjacent said mounting assembly and said first vertical wiper, said second vertical wiper having a stationary preparation surface.

6. The passive vehicle surface preparation apparatus of claim 1, further comprising a swing halt assembly positioned adjacent said support arm.

7. The passive vehicle surface preparation apparatus of claim 6, wherein said swing halt assembly comprises a hydraulic damper and spring shock absorber mounted to a halt post.

8. The passive vehicle surface preparation apparatus of claim 1, wherein said wiper includes a covering.

9. The passive vehicle surface preparation apparatus of claim 1, wherein said horizontal wiper assembly further comprises a covering over said wiper and a gripping assembly configured to properly hold said covering on said wiper.

10. The passive vehicle surface preparation apparatus of claim 1, wherein said horizontal wiper assembly comprises an endplate having a plurality of apertures staggered relative to one another.

11. The passive vehicle surface preparation apparatus of claim 1, wherein said balance assembly is configured to effectively preload said horizontal wiper assembly.

12. The passive vehicle surface preparation apparatus of claim 1, wherein said balance assembly comprises at least one weight positioned adjacent said second end of at least one of said support arms.

13. A passive vehicle surface preparation apparatus comprising:
   (a) a mounting assembly;
   (b) a support arm assembly having at least one support arm and being pivotally connected to said mounting assembly; and
   (c) a horizontal wiper assembly attached to said support arm assembly, said wiper assembly having:
      (1) a stationary preparation surface;
      (2) a wiper with an axle disposed therein, said axle connected to said support arm assembly;
      (3) at least one endplate positioned adjacent the periphery of said wiper and comprising a plurality of apertures therein; and
      (4) a lock positioned adjacent said support arm and configured to engage at least one of said apertures of said endplate for selectively securing said wiper in a stationary position.

14. The passive vehicle surface preparation apparatus of claim 13, wherein said wiper includes a covering.

15. The passive vehicle surface preparation apparatus of claim 13, wherein said horizontal wiper assembly further comprises a covering over said wiper and a gripping assembly configured to properly hold said covering on said wiper.

16. The passive vehicle surface preparation apparatus of claim 13, wherein said plurality of apertures are staggered relative to one another.

* * * * *